United States Patent [19]

Yamakawa

[11] Patent Number: 4,919,502
[45] Date of Patent: Apr. 24, 1990

[54] TILT ERROR CORRECTIVE SCANNING OPTICAL SYSTEM

[75] Inventor: Kazuo Yamakawa, Osaka, Japan

[73] Assignee: Minolta Camera Kabushiki Kaisha, Osaka, Japan

[21] Appl. No.: 72,723

[22] Filed: Jul. 13, 1987

[30] Foreign Application Priority Data

| Jul. 14, 1986 | [JP] | Japan | 61-165125 |
| Aug. 21, 1986 | [JP] | Japan | 61-196209 |
| Aug. 21, 1986 | [JP] | Japan | 61-196210 |
| Aug. 22, 1986 | [JP] | Japan | 61-197850 |

[51] Int. Cl.$^5$ .................................. G02B 26/10
[52] U.S. Cl. ............................. 350/6.8; 350/6.5
[58] Field of Search ............... 350/6.5, 6.6, 6.7, 6.8, 350/433, 434, 480, 481; 346/76 L; 358/199

[56] References Cited

U.S. PATENT DOCUMENTS

| 3,750,189 | 7/1973 | Fleischer . | |
| 3,946,150 | 3/1976 | Grafton | 178/6.7 R |
| 4,318,583 | 3/1982 | Goshima et al. | 350/6.6 |
| 4,379,612 | 4/1983 | Matsuoka et al. . | |
| 4,390,235 | 6/1983 | Minoura | 350/6.6 |
| 4,443,055 | 4/1984 | Matsuoka et al. . | |
| 4,447,112 | 5/1984 | Matsuoka et al. . | |
| 4,487,472 | 12/1984 | Asano . | |
| 4,496,209 | 1/1985 | Itoh et al. | 350/6.8 |
| 4,512,625 | 4/1985 | Brueggemann | 350/6.8 |
| 4,679,057 | 7/1987 | Hamada . | |
| 4,715,699 | 12/1987 | Morimoto | 350/6.8 |

FOREIGN PATENT DOCUMENTS

| 50-93720 | 7/1975 | Japan . |
| 57-35823 | 2/1982 | Japan . |
| 59-195210 | 11/1984 | Japan . |
| 61-173213 | 8/1986 | Japan . |

Primary Examiner—Bruce Y. Arnold
Assistant Examiner—Loha Ben
Attorney, Agent, or Firm—Price, Gess & Ubell

[57] ABSTRACT

A tilt error corrective scanning optical system for use in a laser scanning machine such as a laser printer. The system comprises a linear image forming optical device for causing a beam to form a linear image on a deflecting device, and a scanning image forming optical device for causing the beam deflected by the deflecting device to form an image on a scanned object. The scanning image forming optical device includes a first lens disposed between the deflecting element and the scanned object, and a second lens disposed at a side of the first lens opposed to the scanned object. The second lens includes a toric surface opposed to the scanned object. A surface of the second lens opposed to the deflecting element, a surface of the first lens opposed to the scanned object or a surface of the first lens opposed to the deflecting element defines a cylindrical surface having a refracting power in a direction perpendicular to a scanning plane.

31 Claims, 14 Drawing Sheets

-0.001f
S.A (SPHERICAL ABERRATION)

-0.01f
F.C (FIELD CURVATURE)

0.5 0.0 -0.5 %
DIST. (DISTORTION)

-0.004f
S.A

-0.08f
F.C

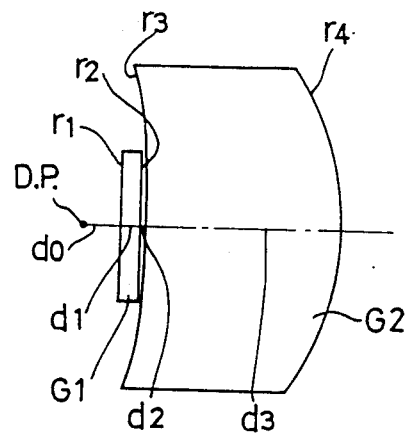
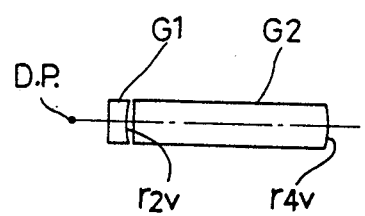
FIG.17A
FIG.17B
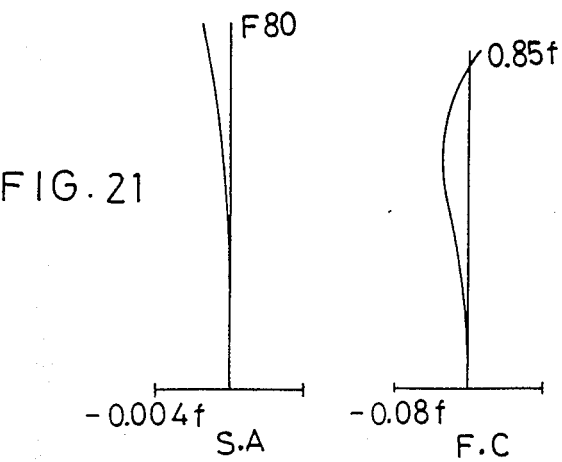
FIG.19
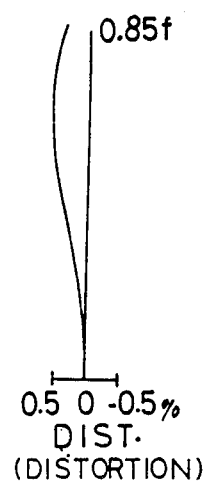
FIG.21

S.A (SPHERICAL ABERRATION)   F.C (FIELD CURVATURE)   DIST. (DISTORTION)

S.A   F.C

FIG. 24A
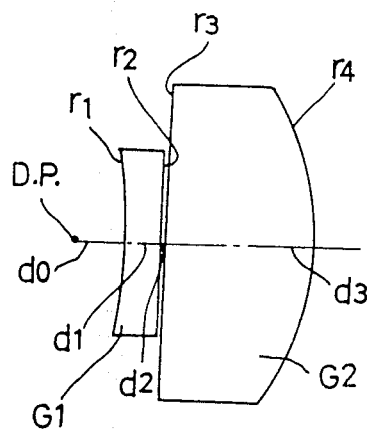
FIG. 24B
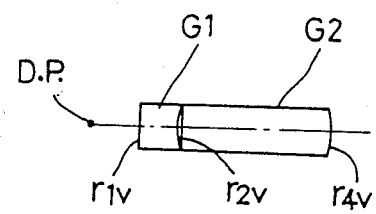
FIG. 27
F 50
−0.001f
S·A (SPHERICAL ABERRATION)
0.85f
−0.01f
F.C (FIELD CURVATURE)
0.85f
0.5 0 −0.5%
DIST (DISTORTION)
FIG. 30
F 80
−0.004f
S.A
0.85f
−0.08f
F.C

TILT ERROR CORRECTIVE SCANNING OPTICAL SYSTEM

BACKGROUND OF THE INVENTION

(1) Field of the Invention

The present invention relates to a tilt error corrective scanning optical system mainly used in a laser printer or the like for eliminating scanning pitch slippage of scanning lines in an auxiliary scanning direction.

More particularly, the present invention relates to a tilt error corrective scanning optical system comprising a linear image forming optical device for causing a beam emitted from a light source to form a linear image on a deflecting and reflecting surface of deflecting means, and a scanning image forming optical device for causing the beam reflected and deflected by the deflecting means to form an image on a scanned object.

(2) Description of the Prior Art

In recent years, there is an increasing demand for the laser beam printer in accordance with diversification and development of office automating machines because of becoming smaller and cheaper as well as advantage of high speed printing. With the laser beam printer including deflecting means such as a polygonal mirror for deflecting a beam emitted from a light source, for example, there occur tilt errors with respect to a direction perpendicular to a scanning plane (in the case of a polygonal mirror, tilt errors with respect to an axis of revolution of reflecting surfaces) which are caused by manufacturing errors, assembly errors or vibrations at times of rotation of the mirror.

The beam reflected by a deflecting and reflecting surface having such errors results in an image forming position on a scanned object slipped or deviated in an auxiliary scanning direction and a nonuniformity in the scanning line pitch. In the case of a recording apparatus such as the laser beam printer, for example, the nonuniformity in the scanning line pitch deteriorates the quality of recorded images.

The aforesaid tilt error corrective scanning optical system is designed for eliminating the nonuniformity in the scanning line pitch. The beam emitted from the light source is once converged by the linear image forming optical device in a direction perpendicular to the scanning plane to form a linear image on a deflecting and reflecting surface of the deflecting means. The beam from a point of deflection and reflection is restored in the above direction by the scanning image forming optical system to form a conjugate image on the scanned object. This process substantially precludes the influence of the tilt errors of the deflecting and reflecting surface.

On the other hand, the tilt error corrective optical system causes the beam to form on the scanned object an image having a height proportional to an incident angle of the beam on the scanning image forming optical device, so that the beam scans the object at a constant scanning speed.

In this specification the term "scanning plane" means a plane formed by a time series set of the scanning beam, namely a plane including main scanning lines on the scanned object and an optical axis of the tilt corrective scanning optical system.

Various constructions of the tilt corrective scanning optical system have been proposed heretofore.

One example is disclosed in U.S. Pat. No. 3,750,189. This construction comprises a scanning image forming optical device including a beam shaping optical element such as a cylindrical lens for restoring the beam into a circular form, which beam has been converged into a line by a linear image forming optical element and reflected by deflecting means, and a converging optical element for converging the restored beam to form an image on the scanned object.

Where the beam is restored by the beam shaping optical element as in the above construction, the restrictive condition to regain the circular beam is imposed on the beam shaping optical element. As a result, there is a reduced freedom for improving distortion characteristics provided for the converging optical element to realize the constant scanning speed of the beam and image forming characteristics for forming images on the scanned object. In order to realize excellent distortion and image forming characteristics, the scanning image forming optical device requires many lenses, thereby complicating the optical device construction.

The Japanese patent application laid open under No. 50-93720 discloses a proposal for improving the foregoing prior construction. In this construction, a beam shaping optical element such as a cylindrical lens as noted above is interposed between the converging optical element and the scanned object.

With this construction, the beam shaping optical element must be located close to the scanned object in order to produce high quality images. It is therefore necessary for the beam shaping optical element to be long in the main scanning direction, which is contrary to a compact construction.

A further known construction is disclosed in U.S. Pat. No. 4,379,612 wherein the scanning image forming optical device disposed between the deflecting means and the scanned object comprises a single spherical lens and a single lens including a toric surface, the latter being disposed at a side of the single spherical lens opposed to the scanned object. This scanning image forming optical device has the distortion characteristics for realizing the constant speed scanning of the beam as well as the function to correct the tilt errors of the deflecting and reflecting surfaces in cooperation with the linear image forming optical system.

Although this construction realizes a compact optical system, only a limited freedom is provided thereby. For example, it is difficult to enlarge the field angle for increasing the scanning range of the beam where both the distortion characteristics for realizing the constant speed scanning of the beam and the function to correct the tilt errors of the deflecting and reflecting surfaces are maintained in an excellent state.

SUMMARY OF THE INVENTION

The object of the present invention is to eliminate the disadvantages of the known optical systems and to provide a compact tilt error corrective optical system comprising a linear image forming optical device for causing a beam emitted from a light source to form a linear image on a deflecting and reflecting surface of deflecting means and a scanning image forming optical device for causing the beam reflected and deflected by the deflecting means to form an image on a scanned object, this optical system permitting the field angle to be enlarged in the main scanning direction while maintaining excellent image forming characteristics and an excellent tilt error correcting function.

The foregoing object is accomplished in one preferred embodiment of the invention by providing a scanning image forming optical device for causing the beam reflected and deflected by the deflecting means to form an image on a scanned object, the scanning image forming optical device consisting of a first lens disposed between the deflecting means and the scanned object, and a second lens disposed at a side of the first lens opposed to the scanned object, wherein the first lens includes a cylindrical surface, and the second lens defines a toric surface.

The term "toric surface" hereinafter used refers to a refracting surface having one refracting power in the main scanning direction of the beam and another refracting power in the auxiliary scanning direction which is perpendicular to the main scanning direction, in a plane perpendicular to the optical axis of the tilt corrective scanning optical system.

The term "cylindrical surface" refers to one form of toric surface having a refracting power only in either the main scanning direction or the auxiliary scanning direction.

In the construction defined above, the cylindrical surface and toric surface are provided by different lenses. This feature enables the tilt corrective scanning optical system to maintain excellent image forming characteristics over a very wide range in the direction perpendicular to the scanning plane, thereby increasing the designing freedom. This diminishes designing restrictions in the direction parallel to the scanning plane. In this direction the optical system is capable of maintaining excellent image forming characteristics and enlarging the field angle while having distortion characteristics for maintaining sufficiently reliable constant speed scanning of the scanned object by the beam.

Furthermore, this optical system has a wide range of magnification while maintaining a deflecting and reflecting point on the deflecting means and an image forming point on the scanned object in conjugation with respect to the scanning image forming optical device in the direction perpendicular to the scanning plane. The lower the magnification, the better is the effect of tilt error correction. Conversely, the higher the magnification, the better the image forming characteristics tend to become. Thus, magnification may be set in accordance with required performance.

The increased designing freedom as described above allows a small size optical system to be designed with ease to fulfill desired performance. Thus the optical system may be able to provide a large field angle and have a compact construction.

According to a further development of this embodiment, the first and second lenses include plane and spherical surfaces opposed to the cylindrical and toric surfaces, respectively. This feature provides for accurate position setting at times of shaping the cylindrical and toric surfaces, thereby to facilitate shaping work.

In particular, the cylindrical surface of the first lens has a negative refracting power in the direction perpendicular to the scanning plane, and the first lens as a whole has a negative refracting power in this direction. This construction promotes the image forming characteristics over a wide range in this direction.

The negative cylindrical surface may be defined at a side of the first lens opposed to the deflecting means. This realizes an optical system providing a wide field angle and capable of effectively correcting tilt errors of the deflecting and reflecting surfaces of the deflecting means which is carried out through this negative cylindrical surface and the toric surface of the second lens.

It is advantageous if the second lens has a concave surface opposed to the deflecting means. This enables the optical system to have good image forming characteristics in the direction perpendicular to the scanning plane while promoting the constant speed scanning of the beam with a distortion provided in the direction parallel to the scanning plane.

In a still further development of this embodiment, the negative cylindrical surface is defined on the side of the first lens opposed to the scanned object. This enables the optical system to have excellent image forming characteristics over a wide range of the scanned object in the direction perpendicular to the scanning plane.

It is still further advantageous if the following conditions (A) and (B) are satisfied to maintained excellent image forming characteristics:

$$f1H < 0 \qquad (A)$$

wherein $f1H$ is a focal length of the first lens in the direction parallel to the scanning plane, and $$|f1H/f1V| > 2 \qquad (B)$$

wherein $f1V$ is a focal length of the first lens in the direction perpendicular to the scanning plane.

The condition (A) relates mainly to the distortion deliberately provided in the direction parallel to the scanning plane in order to realize the constant speed scanning of the beam on the scanned object. Where this condition is not satisfied, it is difficult to maintain reliable constant speed scanning over a wide field angle, which renders the optical system unfit for practical use.

The condition (B) is mainly for correcting spherical aberration and field curvature in the direction perpendicular to the scanning plane. Where this condition is not satisfied, it is difficult to correct the above two aberrations with a good balance over a wide field angle. Particularly where the field curvature is not sufficiently corrected, the spot size varies on the scanning lines which deteriorates image quality.

The object of the present invention is accomplished in another embodiment by providing a scanning image forming optical device for causing the beam reflected and deflected by the deflecting means to form an image on a scanned object, the scanning image forming optical device consisting of a first lens disposed between the deflecting means and the scanned object, and a second lens disposed at a side of the first lens opposed to the scanned object, wherein the first lens comprises a cylindrical lens having no refracting power in a direction parallel to a scanning plane, and the second lens includes a toric surface.

This construction produces effects similar to those of the foregoing embodiment. As in the foregoing embodiment, the two lenses constituting the scanning image forming optical device include a plane surface opposed to the cylindrical surface and a spherical surface opposed to the toric surface, respectively. This feature provides for accurate position setting at times of shaping the cylindrical and toric surfaces, thereby to facilitate shaping work.

The cylindrical surface is defined at a side of the cylindrical lens opposed to the scanned object and has a negative refracting power in the direction perpendicular to the scanning plane. This realizes an optical system providing a wide field angle and capable of correcting tilt errors of the deflecting and reflecting surfaces of the deflecting means with enhanced reliability which is carried out through this negative cylindrical surface and the toric surface of the second lens.

The second lens may include a concave surface opposed to the deflecting means to provide the same advantage as noted hereinbefore.

The object of the present invention may be accomplished in a further embodiment by providing a scanning image forming optical device for causing the beam reflected and deflected by the deflecting means to form an image on a scanned object, the scanning image forming optical device consisting of a first lens disposed between the deflecting means and the object scanned, and a second lens disposed at a side of the first lens opposed to the scanned object, wherein the first lens includes a first cylindrical surface having an axis extending perpendicular to a scanning plane and a second cylindrical surface having an axis extending perpendicular to an optical axis in the scanning plane, and the second lens includes a toric surface.

This construction also produces effects similar to those of the foregoing embodiments. The aspect of this embodiment worthy of special mention is that the cylindrical surface having an axis extending perpendicular to the scanning plane increases the designing freedom in the direction parallel to the scanning plane, thereby to secure excellent constant speed scanning over a wide field angle.

In this embodiment the second lens includes a plane or spherical surface opposed to the toric surface. This feature provides for accurate position setting at times of shaping the toric surface, thereby to facilitate shaping work as in the case of the foregoing embodiments.

The second cylindrical surface of the first lens having an axis extending perpendicular to the optical axis in the scanning plane is opposed to the deflecting means and has a negative refracting power. This realizes an optical system providing a wide field angle and capable of effectively correcting tilt errors of the deflecting and reflecting surfaces of the deflecting means with which is carried out through this negative cylindrical surface and the toric surface of the second lens.

Further, the second lens may include a concave surface opposed to the deflecting means to provide the same advantage as noted hereinbefore.

With this embodiment also, excellent image forming characteristics may be maintained by satisfying the conditions (A) and (B) set out hereinbefore.

The object of the present invention may be accomplished in a still further embodiment by providing a scanning image forming optical device for causing the beam reflected and deflected by the deflecting means to form an image on a scanned object, the scanning image forming optical device consisting of a first lens disposed between the deflecting means and the scanned object, and a second lens disposed at a side of the first lens opposed to the scanned object, wherein the first lens includes a cylindrical surface having an axis extending perpendicular to a scanning plane, and the second lens includes a cylindrical surface having an axis extending perpendicular to an optical axis in the scanning plane, and a toric surface.

This construction also produces effects similar to those of the foregoing embodiments. The aspect of this embodiment worthy of special mention is that the first lens includes a cylindrical surface having an axis extending perpendicular to the scanning plane and this increases the designing freedom in the direction parallel to the scanning plane. In this direction the optical system is capable of maintaining excellent image forming characteristics and enlarging the field angle while having distortion characteristics for maintaining sufficiently reliable constant speed scanning of the scanned object by the beam.

This feature allows the optical system to maintain excellent image forming characteristics over a wide range in the direction perpendicular to the scanning plane which is achieved through the cylindrical surface and toric surface of the second lens.

With this embodiment too, it is advantageous if the cylindrical surface of the second lens is defined on the side opposed to the deflecting means to have a negative refracting power in the direction perpendicular to the scanning plane. The cylindrical surface having a negative refracting power in the direction perpendicular to the scanning plane enables the optical system to have sufficient image forming characteristics over a wide range in that direction.

With this embodiment, excellent image forming characteristics may be maintained by satisfying the condition (A) set out hereinbefore.

The four embodiments for accomplishing the object of the present invention have been described along with several modifications thereof. The common basic concept of the various constructions according to the invention resides in a scanning image forming optical device for causing the beam reflected and deflected by the deflecting means to form an image on a scanned object, the scanning image forming optical device consisting of a first lens disposed between the deflecting means and the scanned object, and a second lens disposed at a side of the first lens opposed to the scanned object, wherein the second lens includes a toric surface opposed to the scanned object, and one of a surface of the second lens opposed to the deflecting means, a surface of the first lens opposed to the scanned object and a surface of the first lens opposed to the deflecting means defines a cylindrical surface having a refracting power in a direction perpendicular to a scanning plane.

Other objects, features and advantages of the present invention will be apparent from the following description.

BRIEF DESCRIPTION OF THE DRAWINGS

FIGS. 1A and 1B through FIGS. 5A and 5B show various examples of lens arrangement in a scanning image forming optical device of a tilt error corrective scanning optical system according to a first embodiment of the present invention, in which FIGS. 1A through 5A are sectional views taken in a direction parallel to a scanning plane, and FIGS. 1B through 5B are sectional views taken in a direction perpendicular to the scanning plane.

FIGS. 16A, 16B, 17A and 17B show examples of lens arrangement in a scanning image forming optical device of a tilt error corrective scanning optical system according to a second embodiment of the present invention, in which FIGS. 16A and 17A are sectional views taken in the direction parallel to the scanning plane, and FIGS. 16B and 17B are sectional views taken in the direction perpendicular to the scanning plane.

FIGS. 18 and 19 are aberration diagrams in the direction parallel to the scanning plane in the examples of lens arrangement according to the second embodiment.

FIGS. 20 and 21 are aberration diagrams in the direction perpendicular to the scanning plane in the examples of lens arrangement according to the second embodiment.

FIGS. 22A and 22B through FIGS. 24A and 24B show examples of lens arrangement in a scanning image forming optical device of a tilt error corrective scanning optical system according to a third embodiment of the present invention, in which FIGS. 22A through 24A are sectional views taken in the direction parallel to the scanning plane, and FIGS. 22B through 24B are sectional views taken in the direction perpendicular to the scanning plane.

FIGS. 25 through 27 are aberration diagrams in the direction parallel to the scanning plane in the examples of lens arrangement according to the third embodiment.

FIGS. 28 through 30 are aberration diagrams in the direction perpendicular to the scanning plane in the examples of lens arrangement according to the third embodiment.

FIGS. 31A and 31B through FIGS. 33A and 33B show examples of lens arrangement in a scanning image forming optical device of a tilt error corrective scanning optical system according to a fourth embodiment of the present invention, in which FIGS. 31A through 33A are sectional views taken in the direction parallel to the scanning plane, and FIGS. 31B through 33B are sectional views taken in the direction perpendicular to the scanning plane.

DESCRIPTION OF THE PREFERRED EMBODIMENTS

The present invention will be described hereinafter by referring to specific examples of embodiments. A tilt error corrective scanning optical system according to the invention is used in a laser scanning apparatus such as a laser beam printer.

Figure 40:
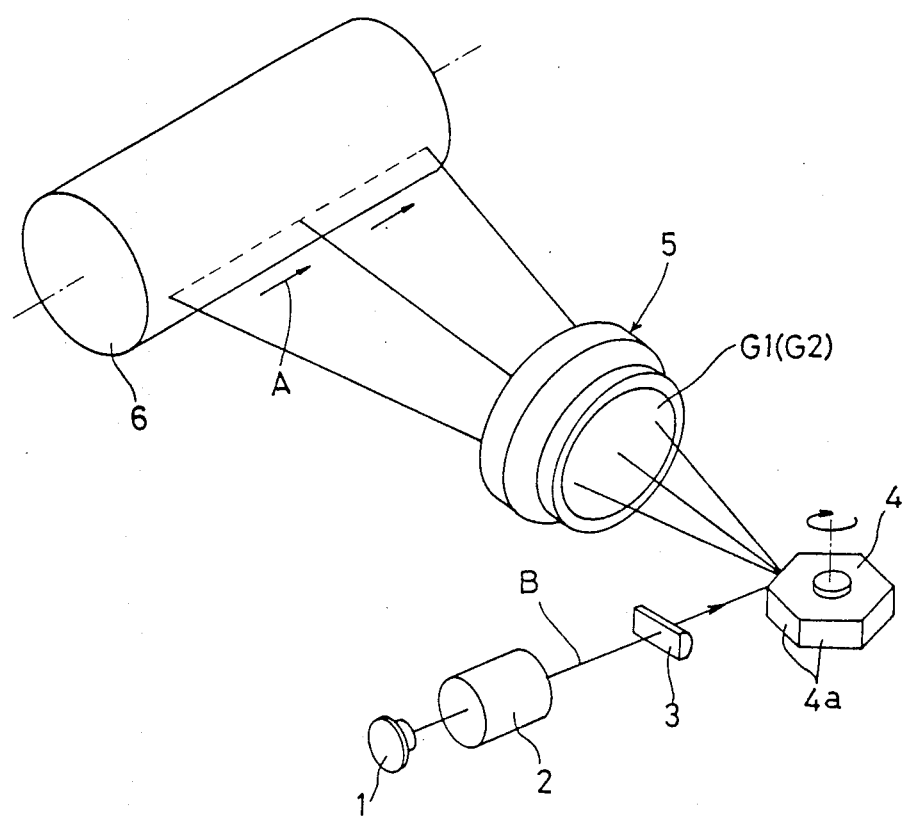
FIG. 40 is a schematic view of a laser beam printer employing the tilt error corrective scanning optical system according to the present invention.

As shown in FIG. 40, the laser scanning apparatus comprises a semiconductor laser 1, a collimator lens 2, a cylindrical lens 3, a polygonal mirror 4, an f$\theta$ lens 5 and a photoreceptor drum 6.

The semiconductor laser 1 emits a laser beam B directly modulated in accordance with image data. The laser beam B, which is one example of a beam, is shaped by the collimator lens 2 into parallel rays. The parallel rays are converged into a line by the cylindrical lens 3 which is one example of linear image forming optical element. The laser beam B then forms an image on a deflecting surface 4a of the polygonal mirror 4 which is one example of deflecting means. The laser beam B reflected and deflected by the deflecting surface 4a with a rotation of the polygonal mirror 4 proceeds to the f$\theta$ lens 5 which is one example of scanning image forming optical device. The f$\theta$ lens 5 causes the laser beam B to scan the photoreceptor drum 6 in a direction indicated by reference A in the drawing, thereby forming an image on the drum 6.

The tilt error corrective scanning optical system includes the described linear image forming optical element 3 and the scanning image forming optical device 5 having two lenses G1 and G2, and eliminates pitch slippage of scanning lines resulting from tilt errors of deflecting surfaces 4a.

As described hereinbefore, there are four basic embodiments of the invention, and each embodiment includes two to five variations. Each example is illustrated by the views showing a lens arrangement, an aberration diagram for a direction parallel to a scanning plane and an aberration diagram for a direction perpendicular to the scanning plane. The relationship between the various embodiments and the drawings are listed en bloc in Table 1 hereunder.

TABLE 1

Figure 1A:
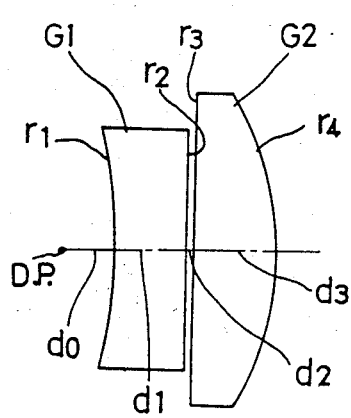
Figure 1B:
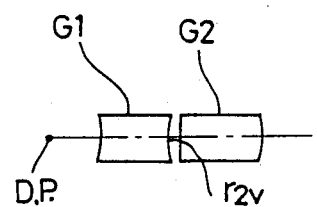
Figure 6:
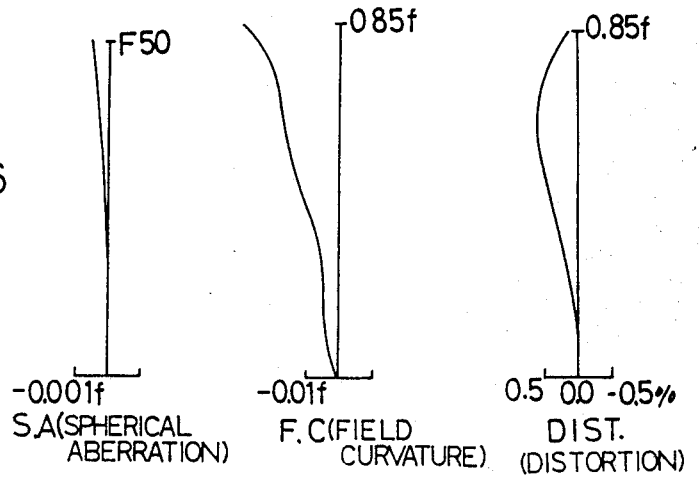
FIGS. 6 through 10 are aberration diagrams in the direction parallel to the scanning plane in the examples of lens arrangement according to the first embodiment.
Figure 11:
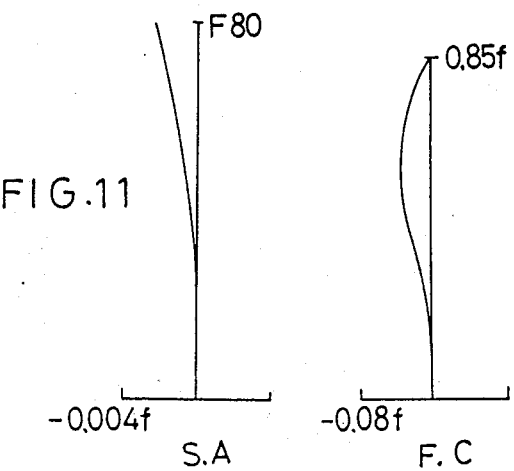
FIGS. 11 through 15 are aberration diagrams in the direction perpendicular to the scanning plane in the examples of lens arrangement according to the first embodiment.
Figure 2A:
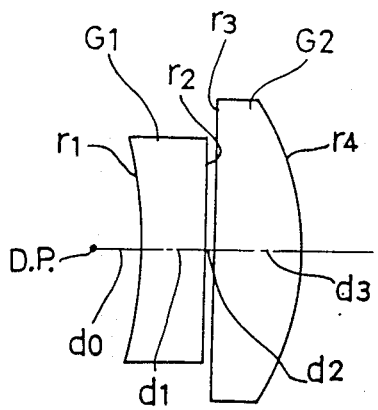
Figure 2B:
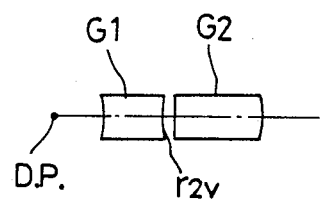
Figure 7:
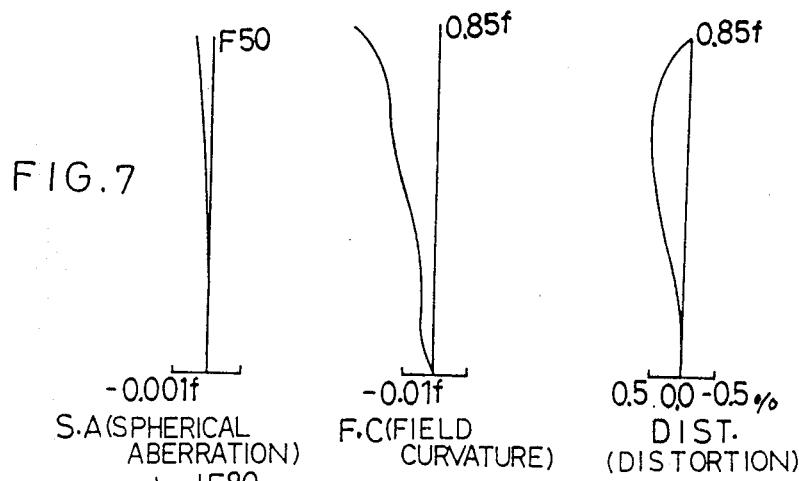
Figure 12:
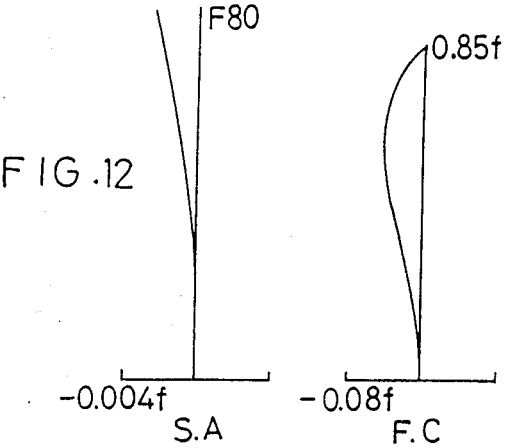
Figure 3A:
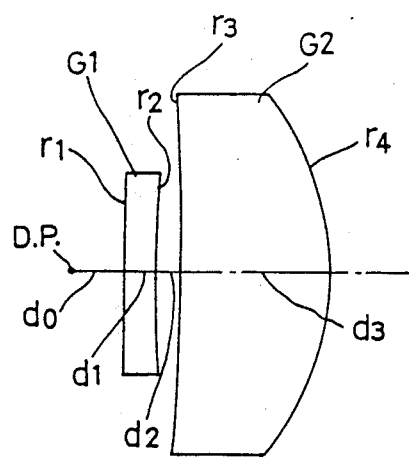
Figure 3B:
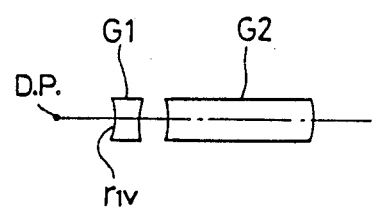
Figure 8:
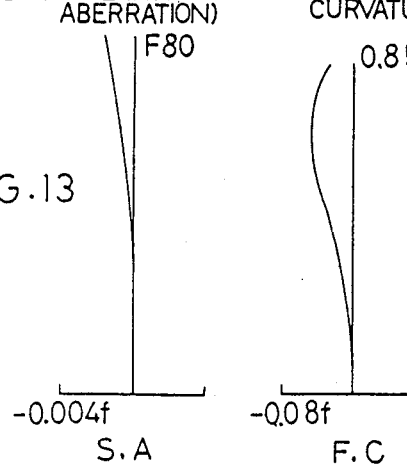
Figure 13:
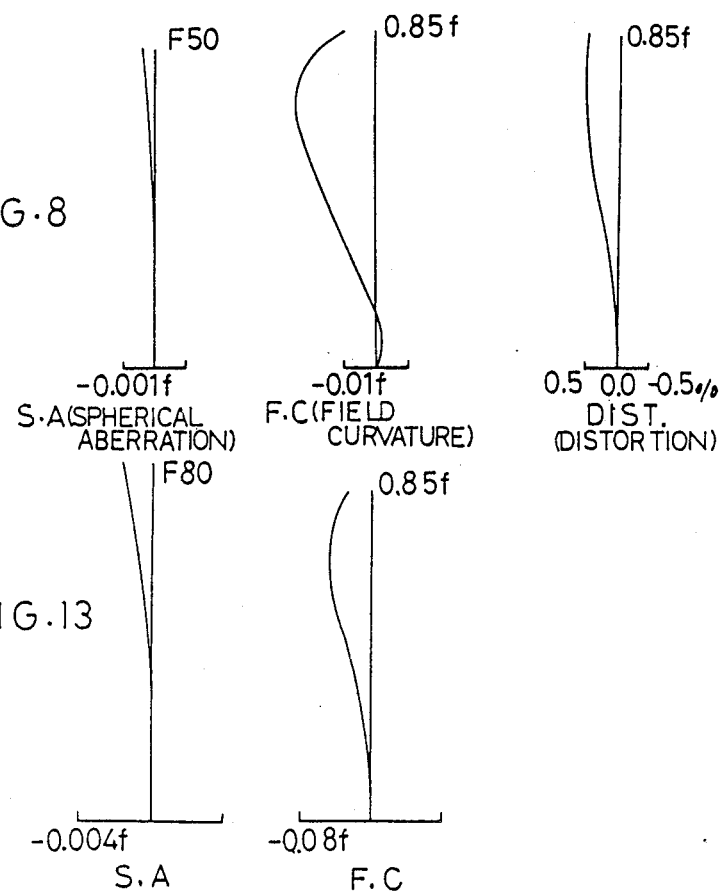
Figure 4A:
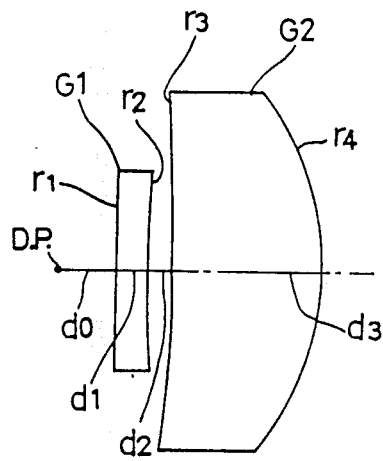
Figure 4B:
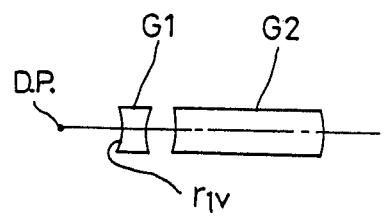
Figure 9:
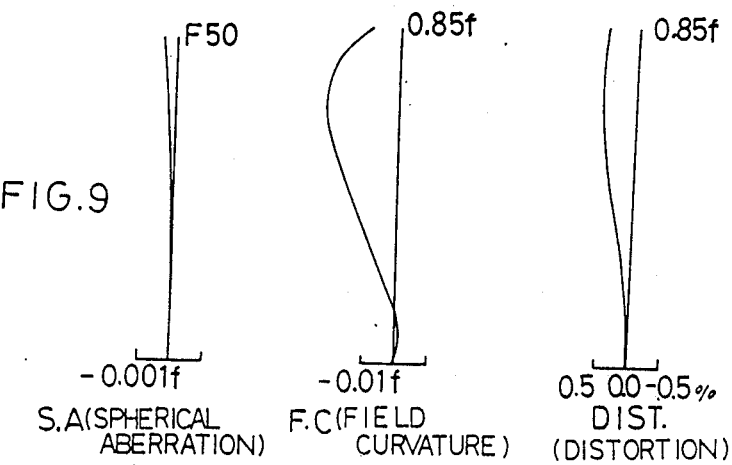
Figure 14:
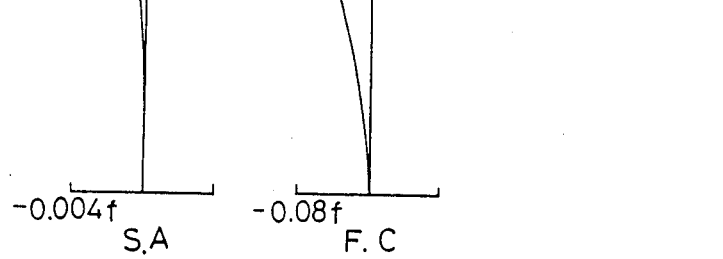
Figure 5A:
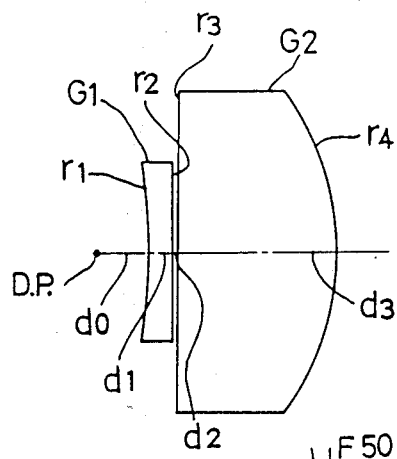
Figure 5B:
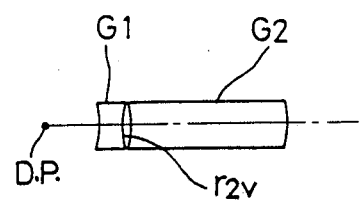
Figure 10:
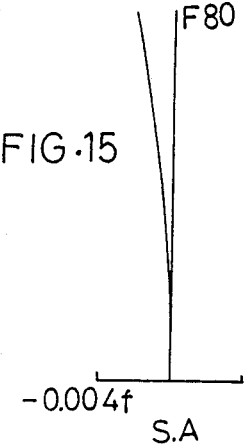
Figure 15:
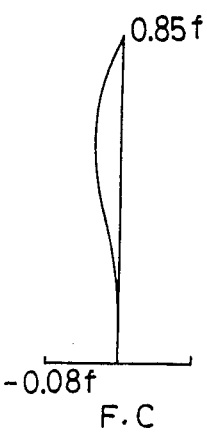
Figure 16A:
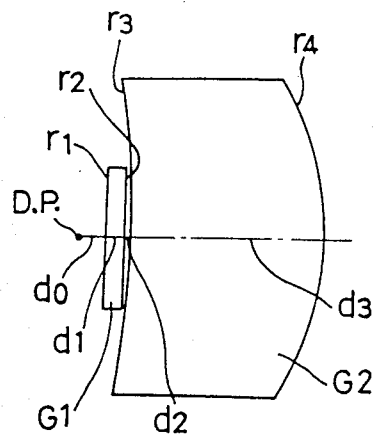
Figure 16B:
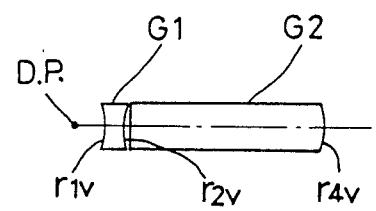
Figure 18:
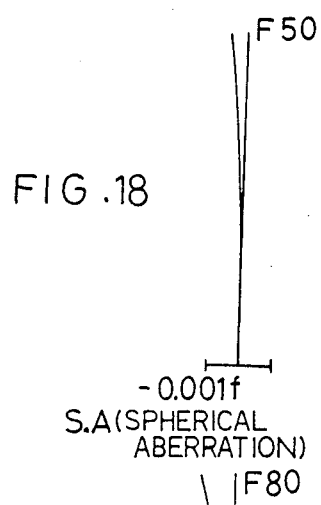
Figure 18:
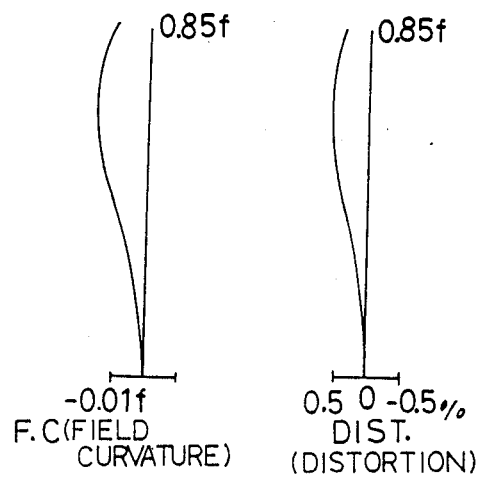
Figure 20:
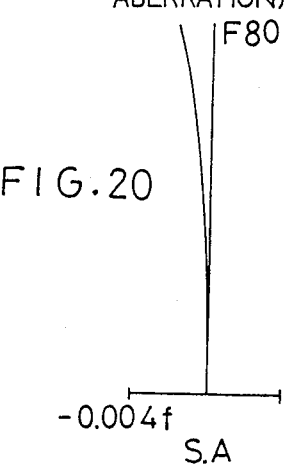
Figure 20:
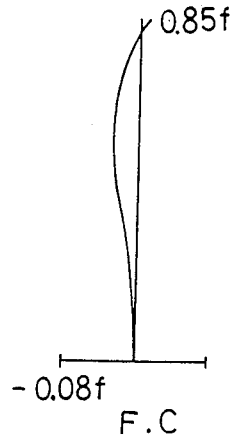
Figure 22A:
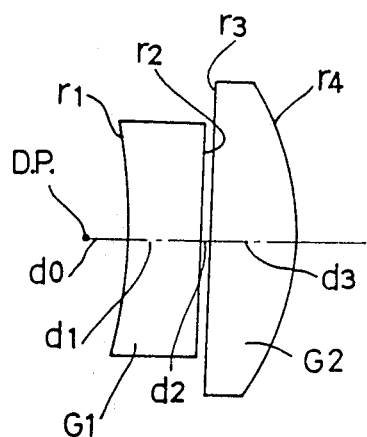
Figure 22B:
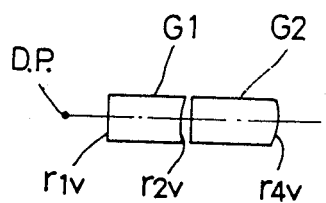
Figure 25:
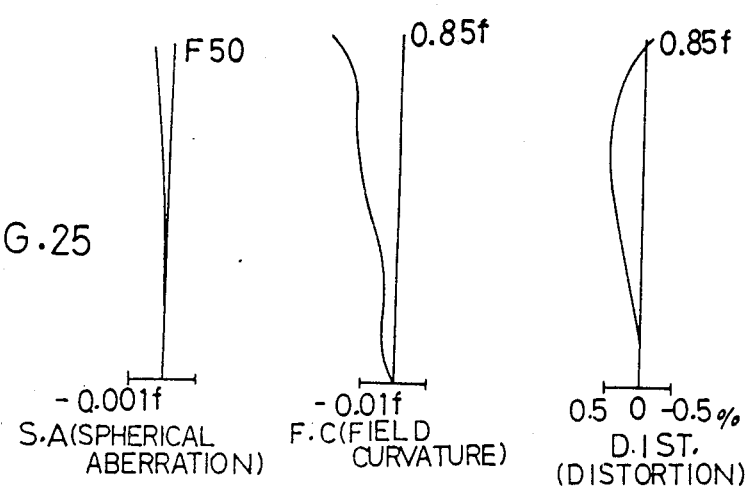
Figure 28:
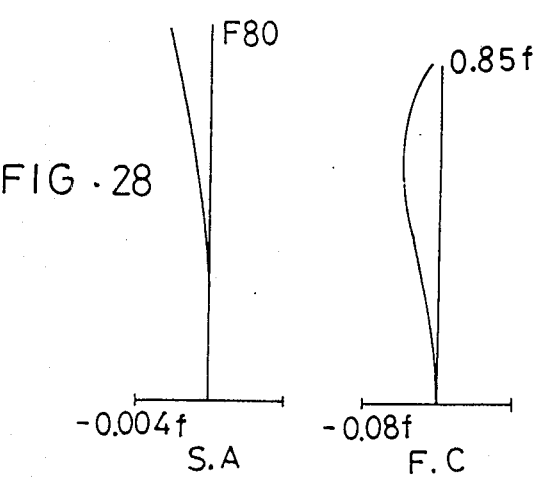
Figure 23A:
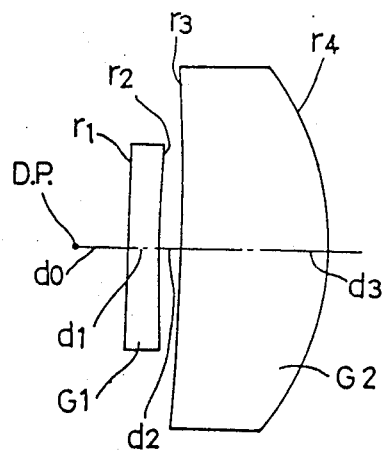
Figure 23B:
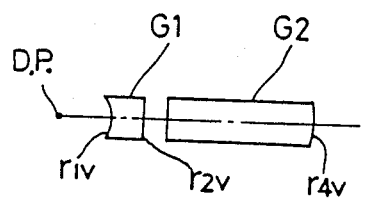
Figure 26:
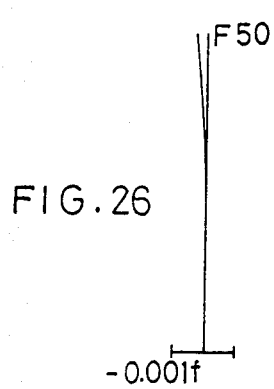
Figure 29:
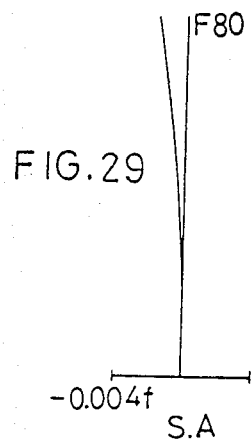
Figure 29:
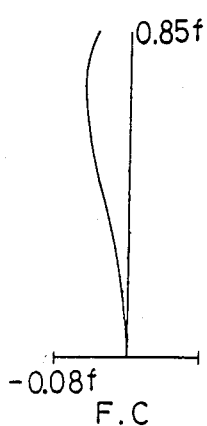
Figure 31A:
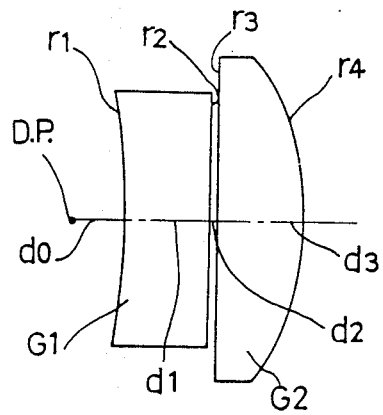
Figure 31B:
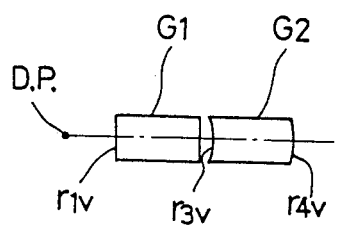
Figure 34:
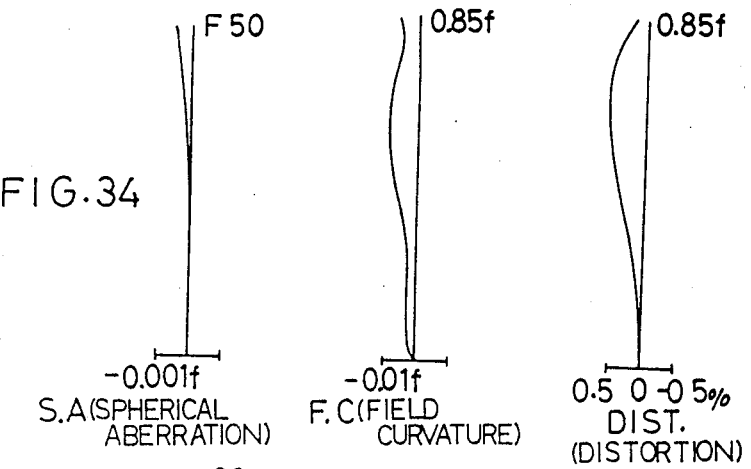
FIGS. 34 through 36 are aberration diagrams in the direction parallel to the scanning plane in the examples of lens arrangement according to the fourth embodiment.
Figure 37:
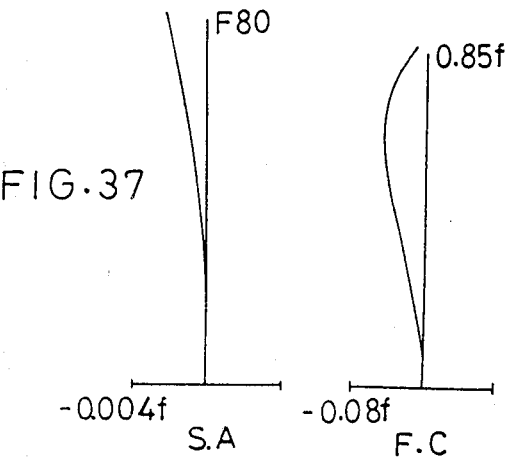
FIGS. 37 through 39 are aberration diagrams in the direction perpendicular to the scanning plane in the examples of lens arrangement according to the fourth embodiment.
Figure 32A:
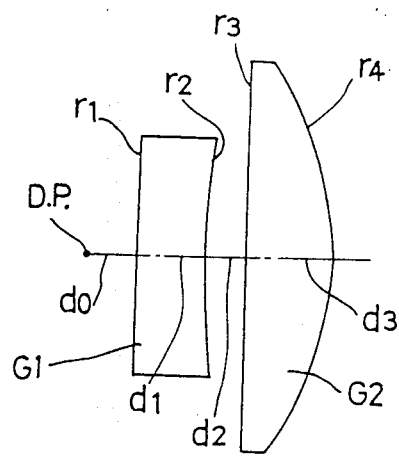
Figure 32B:
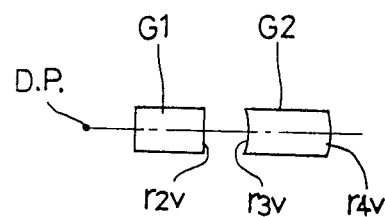
Figure 35:
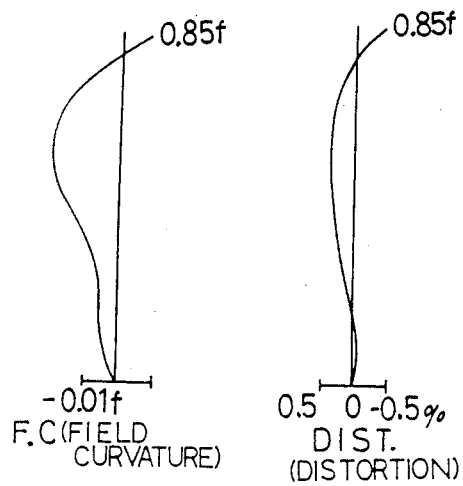
Figure 38:
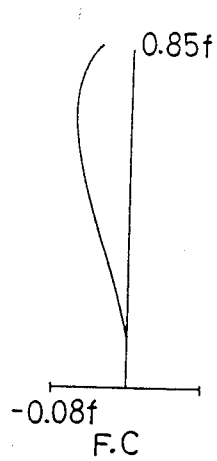
Figure 33A:
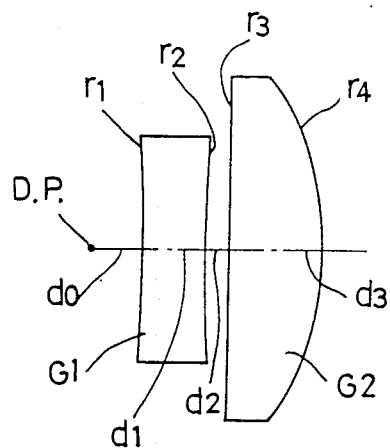
Figure 33B:
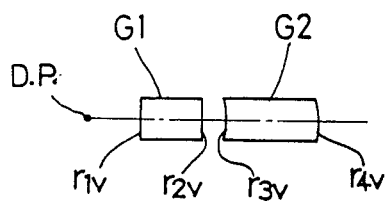
Figure 36:
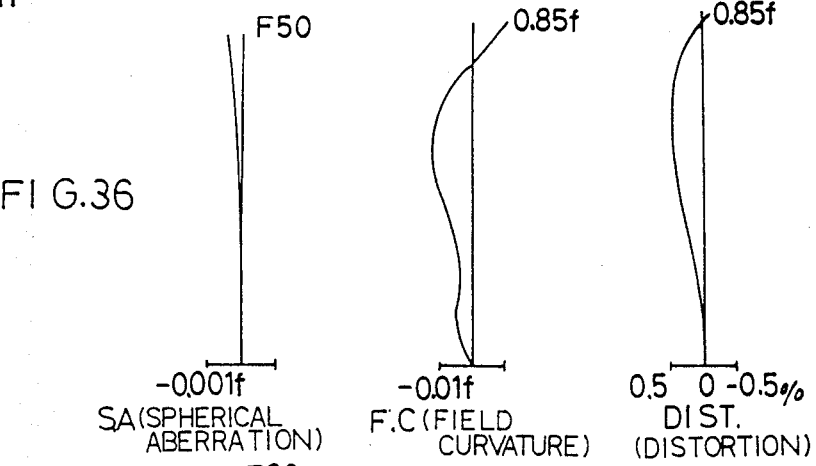
Figure 39:
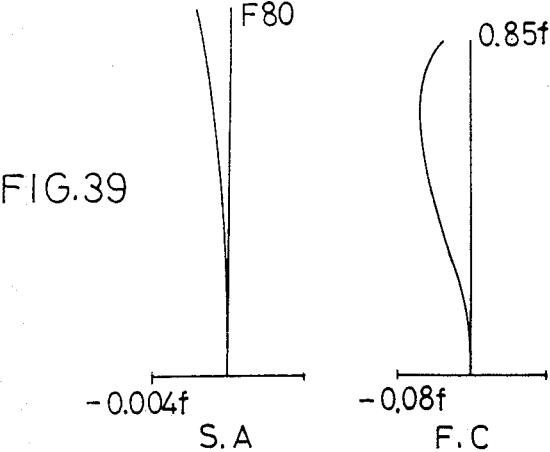

| Embodiments | Lens Arrangements | Aberrations Following Scan Plane | Aberrations Across Scan Plane |
|---|---|---|---|
| 1-1 | FIGS. 1A & 1B | FIG. 6 | FIG. 11 |
| 1-2 | FIGS. 2A & 2B | FIG. 7 | FIG. 12 |
| 1-3 | FIGS. 3A & 3B | FIG. 8 | FIG. 13 |
| 1-4 | FIGS. 4A & 4B | FIG. 9 | FIG. 14 |
| 1-5 | FIGS. 5A & 5B | FIG. 10 | FIG. 15 |
| 2-1 | FIGS. 16A & 16B | FIG. 18 | FIG. 20 |
| 2-2 | FIGS. 17A & 17B | FIG. 19 | FIG. 21 |
| 3-1 | FIGS. 22A & 22B | FIG. 25 | FIG. 28 |
| 3-2 | FIGS. 23A & 23B | FIG. 26 | FIG. 29 |
| 3-3 | FIGS. 24A & 24B | FIG. 27 | FIG. 30 |
| 4-1 | FIGS. 31A & 31B | FIG. 34 | FIG. 37 |
| 4-2 | FIGS. 32A & 32B | FIG. 35 | FIG. 38 |
| 4-3 | FIGS. 33A & 33B | FIG. 36 | FIG. 39 |

Factors for the various embodiments incorporating specific constructions of the scanning image forming optical device 5 will be set forth hereinafter. The single asterisk (*) after the reference for the reflecting surface signifies a cylindrical surface, and the double asterisk (**) signifies a toric surface.

In the aberration diagrams for the direction parallel to the scanning plane, an ideal image height for realizing a uniform velocity scanning by the beam is expressed by f.$\theta$, wherein $\theta$ is an incident angle, i.e. an angle formed between the deflected beam and a lens optical axis, and f is a focal length of all scanning optical devices in the direction parallel to the scanning plane, and distortions are expressed by the percentage of difference between the ideal image height and actual image heights as follows:

$$\{(y' - f\theta)/f\theta\} \times 100 \, (\%)$$

wherein y' is an actual image height.

In the factors for the various embodiments, 2$\omega$ is a maximum incident angle, n1 is the refractive index (in 780 nm) of an optical material forming the first lens G1, n2 is the refractive index (in 780 nm) of an optical material forming the second lens G2, f1H is the focal length of the first lens G1 in the direction parallel to the scanning plane, f2H is the focal length of the second lens G2 in the direction parallel to the scanning plane, fV is the focal length of all scanning optical devices in the direction perpendicular to the scanning plane, f1V is the focal length of the first lens G1 in the direction perpendicular to the scanning plane, and f2V is the focal length of the second lens G2 in the direction perpendicular to the scanning plane. The unit of the numerical values for focal lengths, radii of curvature and spaces ($D_0 - D_3$) on optical axis is millimeter unless otherwise indicated.

(Embodiment 1-1)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.5$ | |
| $r_1 = -168.35$ | $r_1V = -168.35$ | | |
| G1 | | $d_1 = 19.5$ | $n_1 = 1.609$ |
| $r_2* = \infty$ | $r_2V = 67.20$ | | |
| | | $d_2 = 2.0$ | |
| $r_3 = \infty$ | $r_2V = \infty$ | | |
| G2 | | $d_3 = 22.0$ | $n_2 = 1.786$ |
| $r_4** = -74.10$ | $r_4V = -21.87$ | | |
| $f_{1H} = -276.391$ $f_{1V} = -76.459$ $f_{1H}/f_{1V} = 3.61$ | | | |

(Embodiment 1-2)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 12.0$ | |
| $r_1 = -128.91$ | $r_1V = -128.91$ | | |
| G1 | | $d_1 = 17.0$ | $n_1 = 1.511$ |
| $r_2* = \infty$ | $r_2V = 50.91$ | | |
| | | $d_2 = 2.0$ | |
| $r_3 = \infty$ | $r_3V = \infty$ | | |
| G2 | | $d_3 = 23.0$ | $n_2 = 1.786$ |
| $r_4** = -72.47$ | $r_4V = -21.23$ | | |
| $f_{1H} = -252.184$ $f_{1V} = -69.188$ $f_{1H}/f_{1V} = 3.64$ | | | |

(Embodiment 1-3)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 15.6$ | |
| $r_1* = \infty$ | $r_1V = -8.95$ | | |
| G1 | | $d_1 = 8.6$ | $n_1 = 1.511$ |
| $r_2 = 506.15$ | $r_2V = 506.15$ | | |
| | | $d_2 = 6.4$ | |
| $r_3 = -623.06$ | $r_3V = -623.06$ | | |
| G2 | | $d_3 = 40.4$ | $n_2 = 1.786$ |
| $r_4** = -80.87$ | $r_4V = -25.21$ | | |
| $f_{1H} = -990.177$ $f_{1V} = -17.107$ $f_{1H}/f_{1V} = 57.89$ | | | |

(Embodiment 1-4)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 15.5$ | |
| $r_1* = \infty$ | $r_1V = -11.63$ | | |
| G1 | | $d_1 = 8.6$ | $n_1 = 1.609$ |
| $r_2 = 557.18$ | $r_2V = 557.18$ | | |
| | | $d_2 = 6.4$ | |
| $r_3 = -631.58$ | $r_3V = -631.58$ | | |
| G2 | | $d_3 = 40.3$ | $n_2 = 1.786$ |
| $r_4 = -80.49$ | $r_4V = -25.18$ | | |
| $f_{1H} = -914.748$ $f_{1V} = -18.595$ $f_{1H}/f_{1V} = 49.19$ | | | |

(Embodiment 1-5)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.0$ | |
| $r_1 = -200.62$ | $r_1V = -200.62$ | | |
| G1 | | $d_1 = 7.0$ | $n_1 = 1.786$ |
| $r_2* = \infty$ | $r_2V = 43.65$ | | |
| | | $d_2 = 1.1$ | |
| $r_3 = \infty$ | $r_3V = \infty$ | | |
| G2 | | $d_3 = 42.0$ | $n_2 = 1.786$ |
| $r_4** = -73.30$ | $r_4V = -23.17$ | | |
| $f_{1H} = -255.334$ $f_{1V} = -45.063$ $f_{1H}/f_{1V} = 5.67$ | | | |

(Embodiment 2-1)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 10.0$ | |
| $r_1* = \infty$ | $r_1V = -55.08$ | | |
| G1 | | $d_1 = 5.0$ | $n_1 = 1.511$ |
| $r_2 = \infty$ | $r_2V = 26.25$ | | |
| | | $d_2 = 1.2$ | |
| $r_3 = -241.40$ | $r_3V = -241.40$ | | |
| G2 | | $d_3 = 51.3$ | $n_2 = 1.786$ |
| $r_4** = -76.34$ | $r_4V = -24.20$ | | |

(Embodiment 2-2)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 11.0$ | |
| $r_1 = \infty$ | $r_1V = \infty$ | | |
| G1 | | $d_1 = 5.0$ | $n_1 = 1.511$ |
| $r_2* = \infty$ | $r_2V = 25.48$ | | |
| | | $d_2 = 1.2$ | |
| $r_3 = -229.63$ | $r_3V = -229.63$ | | |
| G2 | | $d_3 = 51.6$ | $n_2 = 1.786$ |
| $r_4** = -75.59$ | $r_4V = -24.78$ | | |

(Embodiment 3-1)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 12.5$ | |
| $r_1^* = -165.22$ | $r_{1V} = \infty$ | | |
| G1 | | $d_1 = 19.8$ | $n_1 = 1.609$ |
| $r_2^* = \infty$ | $r_{2V} = 60.98$ | | |
| | | $d_2 = 2.2$ | |
| $r_3 = \infty$ | $r_{3V} = \infty$ | | |
| G2 | | $d_3 = 22.5$ | $n_2 = 1.786$ |
| $r_4^{**} = -73.95$ | $r_{4V} = -21.89$ | | |

$f_{1H} = -271.251$  $f_{1V} = -100.117$  $f_{1H}/f_{1V} = 2.71$ (Embodiment 3-2)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 15.5$ | |
| $r_1^* = \infty$ | $r_{1V} = -7.92$ | | |
| G1 | | $d_1 = 8.5$ | $n_1 = 1.511$ |
| $r_2^* = 509.21$ | $r_{2V} = \infty$ | | |
| | | $d_2 = 6.4$ | |
| $r_3 = -626.78$ | $r_{3V} = -626.78$ | | |
| G2 | | $d_3 = 40.4$ | $n_2 = 1.786$ |
| $r_4^{**} = -80.94$ | $r_{4V} = -25.02$ | | |

$f_{1H} = -996.16$  $f_{1V} = -15.484$  $f_{1H}/f_{1V} = 64.33$ (Embodiment 3-3)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.0$ | |
| $r_1^* = -200.97$ | $r_{1V} = \infty$ | | |
| G1 | | $d_1 = 10.0$ | $n_1 = 1.786$ |
| $r_2 = \infty$ | $r_{2V} = +49.10$ | | |
| | | $d_2 = 1.1$ | |
| $r_3 = \infty$ | $r_{3V} = \infty$ | | |
| G2 | | $d_3 = 39.0$ | $n_2 = 1.786$ |
| $r_4^{**} = -73.33$ | $r_{4V} = -23.21$ | | |

$f_{1H} = -255.787$  $f_{1V} = -62.490$  $f_{1H}/f_{1V} = 4.09$ (Embodiment 4-1)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.5$ | |
| $r_1^* = -186.29$ | $r_{1V} = \infty$ | | |
| G1 | | $d_1 = 22.0$ | $n_1 = 1.609$ |
| $r_2 = 2701.95$ | $r_{2V} = 2701.95$ | | |
| | | $d_2 = 2.0$ | |
| $r_3^* = \infty$ | $r_{3V} = -128.20$ | | |
| G2 | | $d_3 = 23.0$ | $n_2 = 1.786$ |
| $r_4^{**} = -74.91$ | $r_{4V} = -23.28$ | | |

$f_{1H} = -285.296$ (Embodiment 4-2)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.5$ | |
| $r_1^* = \infty$ | $r_{1V} = \infty$ | | |
| G1 | | $d_1 = 18.0$ | $n_1 = 1.609$ |
| $r_2 = 364.35$ | $r_{2V} = \infty$ | | |
| | | $d_2 = 10.0$ | |
| $r_3^* = \infty$ | $r_{3V} = -99.18$ | | |
| G2 | | $d_3 = 22.8$ | $n_2 = 1.786$ |
| $r_4^{**} = -84.33$ | $r_{4V} = -24.13$ | | |

$f_{1H} = -598.170$ (Embodiment 4-3)
$f = 125$, F No. $= 50$, $2\omega = 97°$

| Radii of Curvature (Main Scan Direction) | Radii of Curvature (Aux. Scan Direction) | On-Axis Distance | Refractive Indices |
|---|---|---|---|
| [Deflection Point] | | | |
| | | $d_0 = 13.5$ | |
| $r_1^* = -386.87$ | $r_{1V} = \infty$ | | |
| G1 | | $d_1 = 16.4$ | $n_1 = 1.609$ |
| $r_2^* = 659.36$ | $r_{2V} = \infty$ | | |
| | | $d_2 = 6.0$ | |
| $r_3 = \infty$ | $r_{3V} = -93.06$ | | |
| G2 | | $d_3 = 24.7$ | $n_2 = 1.786$ |
| $r_4^{**} = -79.66$ | $r_{4V} = -23.15$ | | |

$f_{1H} = -397.923$

What is claimed is:

1. A tilt error corrective scanning optical system for a system having deflecting means for deflecting and reflecting a beam of light, comprising:
   a linear image forming optical device for causing a beam emitted from a light source to form a linear image on a deflecting and reflecting surface of said deflecting means, and
   a scanning image forming optical device for causing the beam reflected and deflected by said deflecting means to form an image on a scanned object, said scanning image forming optical device consisting of a first lens disposed between said deflecting means and said scanned object, and a second lens disposed at a side of said first lens opposed to said scanned object, wherein said first lens includes a cylindrical surface, and said second lens includes a toric surface.

2. A tilt error corrective scanning optical system as claimed in claim 1, wherein said first lens has a negative refracting power in a direction perpendicular to a scanning plane.

3. A tilt error corrective scanning optical system as claimed in claim 2, wherein said cylindrical surface of said first lens is defined on a surface of said first lens opposed to said deflecting means.

4. A tilt error corrective scanning optical system as claimed in claim 3, wherein said second lens defines a concave surface opposed to said deflecting means.

5. A tilt error corrective scanning optical system as claimed in claim 2, wherein said cylindrical surface of said first lens is defined on a surface of said first lens opposed to said scanned object.

6. A tilt error corrective scanning optical system as claimed in any one of claims 2 through 5, wherein said first lens per se as a whole has a negative refracting power in a direction parallel to the scanning plane.

7. A tilt error corrective scanning optical system as claimed in claim 6, wherein said first lens satisfies the following condition:

$$|f1H/f1V| > 2$$

wherein f1H is a focal length of said first lens in the direction parallel to the scanning plane, and f1V is a focal length of said first lens in the direction perpendicular to the scanning plane.

8. A tilt error corrective scanning optical system as claimed in claim 1, wherein said scanning image forming optical device is so arranged that the deflecting and reflecting surface and said scanned object are set in an optical conjugate relationship.

9. A tilt error corrective scanning optical system for a system having deflecting means for deflecting and reflecting a beam of light, comprising:
   a linear image forming optical device for causing a beam emitted from a light source to form a linear image on a deflecting and reflecting surface of said deflecting means, and
   a scanning image forming optical device for causing the beam reflected and deflected by said deflecting means to form an image on a scanned object, said scanning image forming optical device consisting of a first lens disposed between said deflecting means and said scanned object, and a second lens disposed at a side of said first lens opposed to said scanned object, wherein said first lens comprises a cylindrical lens having no refracting power in a direction parallel to a scanning plane, and said second lens includes a toric surface.

10. A tilt error corrective scanning optical system as claimed in claim 9, wherein said first lens has a negative refracting power in a direction perpendicular to the scanning plane.

11. A tilt error corrective scanning optical system as claimed in claim 10, wherein said first lens includes a cylindrical surface on a surface of said first lens opposed to said deflecting means to have a negative refracting power in the direction perpendicular to the scanning plane.

12. A tilt error corrective scanning optical system as claimed in claim 11, wherein said second lens includes a surface opposed to said deflecting means and having a negative refracting power.

13. A tilt error corrective scanning optical system as claimed in claim 9, wherein said scanning image forming optical device is so arranged that the deflecting and reflecting surface and said scanned object are set in an optical conjugate relationship.

14. A tilt error corrective scanning optical system for a system having deflecting means for deflecting and reflecting a beam of light, comprising:
   a linear image forming optical device for causing a beam emitted from a light source to form a linear image on a deflecting and reflecting surface of said deflecting means, and
   a scanning image forming optical device for causing the beam reflected and deflected by said deflecting means to form an image on a scanned object, said scanning image forming optical device consisting of a first lens disposed between said deflecting means and said scanned object, and a second lens disposed at a side of said first lens opposed to said scanned object, wherein said first lens includes a first cylindrical surface having an axis extending perpendicular to a scanning plane and a second cylindrical surface having an axis extending parallel to the scanning plane, and said second lens includes a toric surface.

15. A tilt error corrective scanning optical system as claimed in claim 14, wherein said first lens has a negative refracting power in a direction perpendicular to the scanning plane.

16. A tilt error corrective scanning optical system as claimed in claim 15, wherein said second cylindrical surface is defined on a surface of said first lens opposed to said deflecting means to have a negative refracting power.

17. A tilt error corrective scanning optical system as claimed in claim 15, wherein said second cylindrical surface is defined on a surface of said first lens opposed to said scanned object to have a negative refracting power.

18. A tilt error corrective scanning optical system as claimed in claim 17, wherein said first lens has a negative refracting power in a direction parallel to the scanning plane.

19. A tilt error corrective scanning optical system as claimed in any one of claims 15 through 18, wherein said first lens satisfies the following condition:

$$|f1H/f1V| > 2$$

wherein f1H is a focal length of said first lens in the direction parallel to the scanning plane, f1V is a focal length of said first lens in the direction perpendicular to the scanning plane.

20. A tilt error scanning optical system as claimed in claim 16, wherein said first lens has a negative refracting power in a direction parallel to the scanning plane.

21. A tilt error scanning optical system as claimed in claim 12, wherein said first lens has a negative refracting power in a direction parallel to the scanning plane.

22. A tilt error corrective scanning optical system as claimed in claim 14, wherein said scanning image forming optical device is so arranged that the deflecting and reflecting surface and said scanned object are set in an optical conjugate relationship.

23. A tilt error corrective scanning optical system for a system having deflecting means for deflecting and reflecting a beam of light, comprising:
   a linear image forming optical device for causing a beam emitted from a light source to form a linear image on a deflecting and reflecting surface of said deflecting means, and
   a scanning image forming optical device for causing the beam reflected and deflected by said deflecting means to form an image on a scanned object, said scanning image forming optical device consisting of a first lens disposed between said deflecting means and said scanned object, and a second lens disposed at a side of said first lens opposed to said scanned object, wherein said first lens includes a cylindrical surface having an axis extending perpendicular to a scanning plane, and said second lens includes a cylindrical surface having an axis extending parallel to the scanning plane, and a toric surface.

24. A tilt error corrective scanning optical system as claimed in claim 23, said cylindrical surface of said second lens is defined on a surface of said second lens opposed to said deflecting means to have a negative refracting power in a direction perpendicular to the scanning plane.

25. A tilt error corrective scanning optical system as claimed in claim 24, wherein said first lens has a negative refracting power in a direction parallel to the scanning plane.

26. A tilt error corrective scanning optical system as claimed in claim 23, wherein said scanning image forming optical device is so arranged that the deflecting and reflecting surface and said scanned object are set in an optical conjugate relationship.

27. A tilt error corrective scanning optical system for a system having deflecting means for deflecting and reflecting a beam of light, comprising:
a linear image forming optical device for causing a beam emitted from a light source to form a linear image in a deflecting and reflecting surface of said deflecting means, and
a scanning image forming optical device for causing the beam reflected and deflected by said deflecting means to form an image on a scanned object, said scanning image forming optical device consisting of a first lens disposed between said deflecting means and said scanned object, and a second lens disposed at a side of said first lens opposed to said scanned object, wherein said second lens includes a toric surface opposed to said scanned object, and any one of the remaining surfaces, that is to say, a surface of said second lens opposed to said deflecting means, a surface of said first lens opposed to said scanned object and a surface of said first lens opposed to said deflecting means further defines a cylindrical surface having a refracting power in a direction perpendicular to a scanning plane.

28. A tilt error corrective scanning optical system as claimed in claim 21, wherein said scanning image forming optical device is so arranged that the deflecting and reflecting surface and said scanned object are set in an optical conjugate relationship.

29. A tilt error corrective laser beam printer comprising:
a laser beam source for emitting a laser beam modulated in accordance with image data,
a collimator lens for shaping the laser beam into parallel rays,
a linear image forming optical device for converging the laser beam in parallel rays into a line,
deflecting means for reflecting and deflecting the laser beam converged into a line toward a scanned object, and
a scanning image forming optical device for causing the laser beam reflected and deflected by a deflecting and reflecting surface of said deflecting means to form an image on said scanned object, said scanning image forming optical device consisting of a first lens disposed between said deflecting means and said scanned object, and a second lens disposed at a side of said first lens opposed to said scanned object,
wherein said first lens includes a cylindrical surface, and said second lens includes a toric surface.

30. A laser beam printer as claimed in claim 29 wherein said linear image forming optical device comprises a cylindrical lens.

31. A tilt error corrective scanning optical system as claimed in claim 29, wherein said scanning image forming optical device is so arranged that the deflecting and reflecting surface and said scanned object are set in an optical conjugate relationship.

* * * * *